Patented Aug. 15, 1933

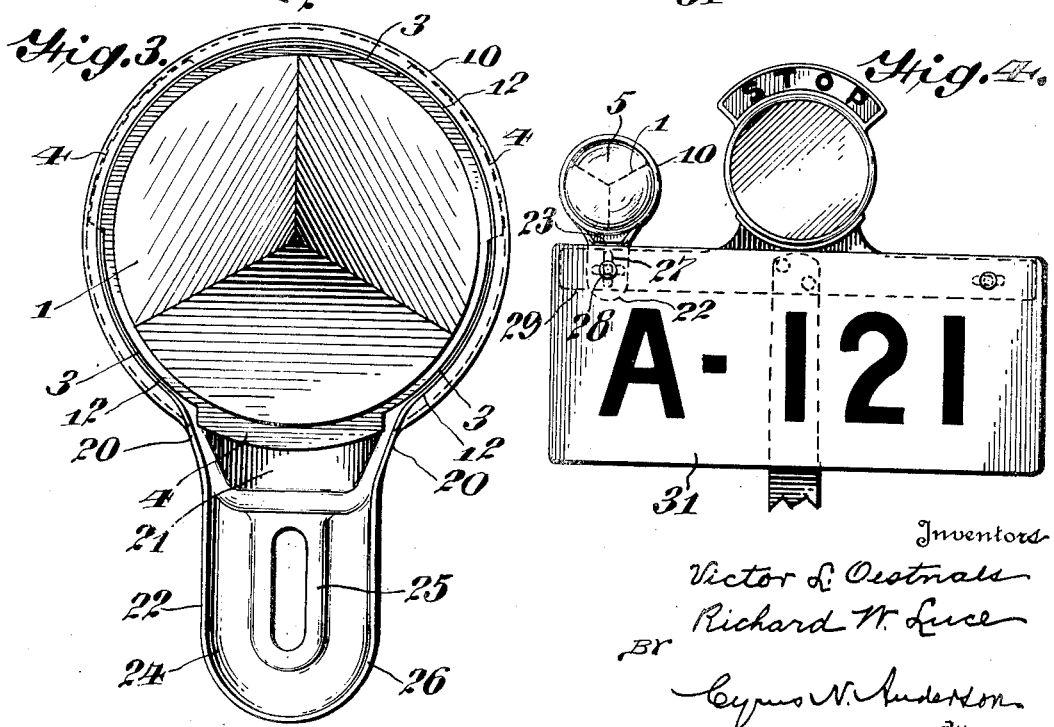

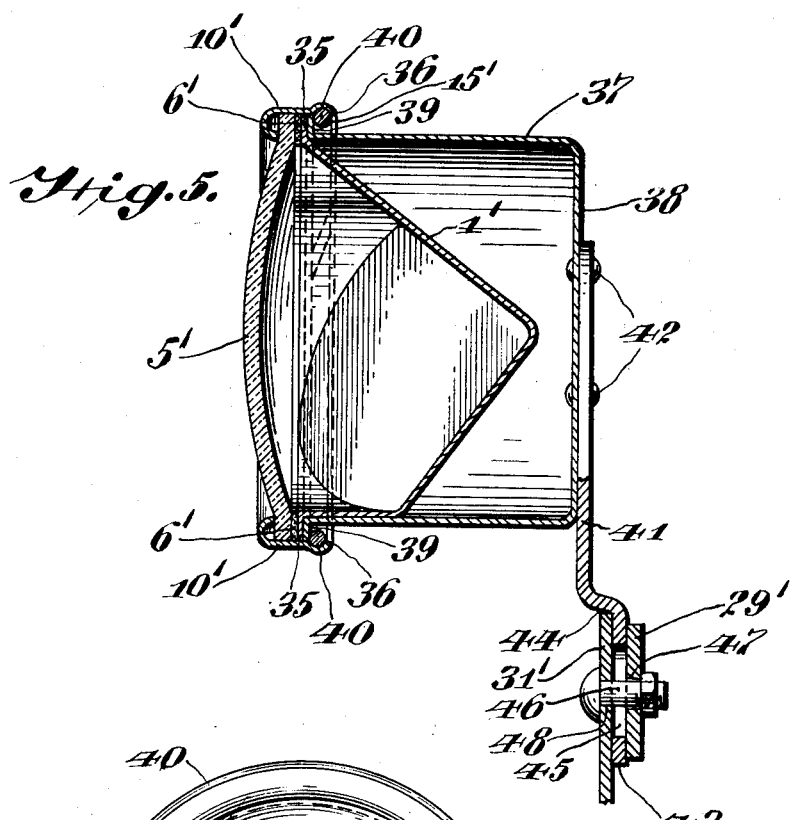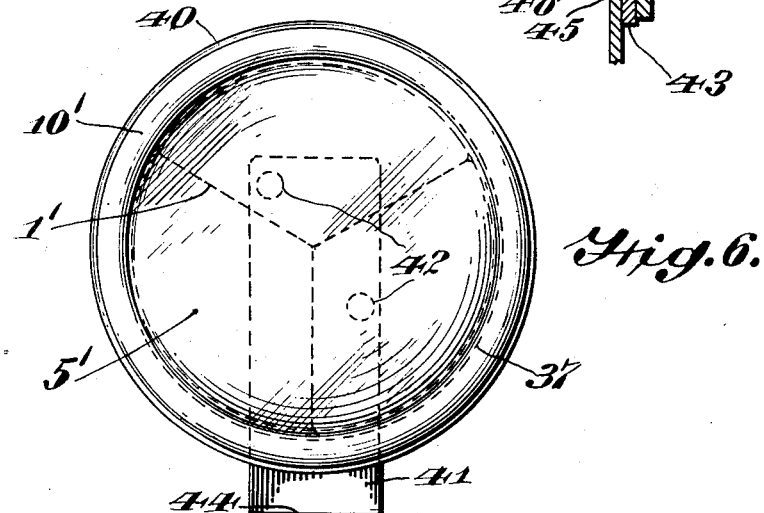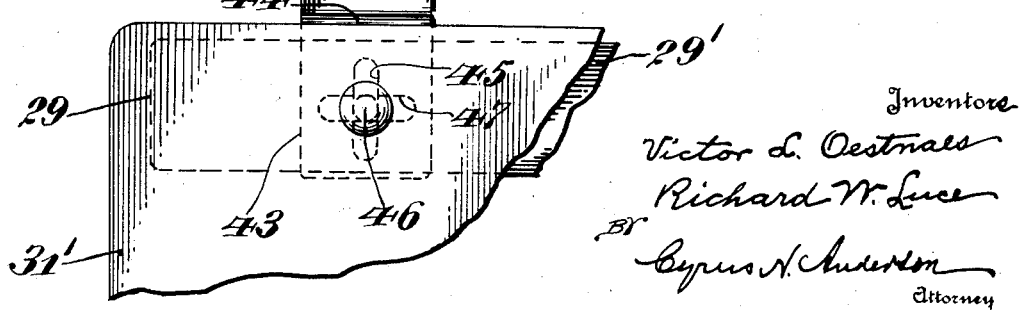

1,922,819

UNITED STATES PATENT OFFICE 1,922,819

SUPPORTING MEANS FOR REFLECTORS AND LIKE DEVICES

Victor L. Oestnaes, Westfield, and Richard W. Luce, Mountainside, N. J., assignors to American Gasaccumulator Company, Elizabeth, N. J., a Corporation of New Jersey Application October 29, 1929. Serial No. 403,334

8 Claims. (Cl. 40—131)

Our invention relates broadly to reflectors, lamps and the like, but more particularly to novel means by which such devices may be supported upon automobiles or other like vehicles and upon other supports to which it may be desired to attach them.

The general object of the invention is to provide means of novel construction for attaching deflectors, lamps and the like to objects by which they may be supported, the said means operating to retain the said reflectors, lamps and the like in predetermined positions with respect to their supports.

It also is an object of the invention to provide means for supporting reflectors, lamps and the like, which is integral or is so connected with and related to an element of the reflector, lamp or other structure as to form in effect a unit of such structure.

A further and more specific object of the invention is to provide means of a character such as to adapt it for cooperation with the number plate of an automobile or other vehicle, such cooperation resulting in retaining the said reflector, lamp or the like, in upright position with respect to the said number plate.

Other objects and advantages of the invention will be pointed out in the detailed description thereof which follows or else will be apparent from such description.

In order that the invention may be readily understood and its practical advantages fully appreciated reference should be had to the accompanying drawings wherein we have illustrated certain embodiments thereof in the forms which at present are preferred by us. It will be understood that the invention is susceptible of embodiment in other forms of construction than those shown and that changes in the details of construction may be made within the scope of the claims without departing from our invention.

In the drawings:

Fig. 1 is a view in front elevation of a reflector provided with means embodying the invention by which it is adapted to be attached to a support therefor;

Fig. 2 is a section taken along the line 2—2 of Fig. 1 in a plane coincident or parallel with the axis of the reflector;

Fig. 3 is a view in rear elevation of the reflector shown in different relation to the retaining means therefor from that which is shown in Figs. 1 and 2;

Fig. 4 is a view in front elevation of the reflector and also showing a number plate of an automobile or the like with which the reflector is associated and also showing a stop light in association therewith;

Fig. 5 is a view similar to that shown in Fig. 2 but showing a modified construction; and Fig. 6 is a view showing a fragmentary portion of a number plate and also showing in front elevation a reflector having supporting means embodying the invention.

In Figs. 1 to 4 of the drawings I have shown a reflector 1 the front edge of which is provided with a laterally and outwardly extending flange 2 portions of which are cut away at spaced intervals as indicated at 3, the cutting away of which provides projecting portions as indicated at 4. Located over the open front side of the reflector is a transparent plate 5 which is seated against an annular washer member 6 of rubber or other suitable preferably non-metallic material. The reflector 1, the plate 5 and the washer 6 are held in assembled relation as shown in Fig. 2 by means of the annular holding plate 10 the front edge of which is bent inwardly and rearwardly as indicated at 11, the rear edge of which inwardly and rearwardly bent portion engages the front side of the plate 5 in adjoining relation to the edge thereof. The opposite edge of the annular holding plate 10 is bent inwardly as indicated at 12. The flange of the reflector 1 is inserted into the annular space between the edge portions 11 and 12 of the member 10 and is retained therein and the reflector thereby retained in place by means of a split ring 15.

It will be noted that the diameter of the outer or peripheral edges of the flange of the reflector 1 is greater than the distance between the inner edges of the inwardly turned rear edge portion 12 of the holding plate member 10, but the presence of the notches formed by the cut away portions as indicated at 3 provides means whereby the flange of the reflector 1 may be inserted underneath the inwardly turned edge portion 12 of the member 10. To enable such insertion a part or section of the rear edge portion of the member 10 is bent outwardly as indicated at 20 and 21, the parts 20 constituting side portions of the outwardly bent part or section. The outwardly bent part or section comprising the portions 20 and 21 are extended and merge into a projection constituting a handle-like portion 22. The projecting portion 22 occupies a position in displaced relation to the portion 21 and to the greater portions of the parts 20, so that a shoulder 23 is formed as shown best perhaps in Fig. 2 of the drawings. A groove is formed in the rear side of the end and side portions of the projection 22 thereby providing upon the front side thereof a raised portion 24 leaving the central portion 25 of the said projection in a relatively elevated position, the rear side of which portion is in substantially the same plane as that of the edges 26 of the projection 22. An elongated opening 27 is provided in the central portion 25. The shoulder 23 extends transversely of the length of the projection which extends laterally, as described, from the annular member 10.

In order to insert the flange of a reflector into position between the inwardly turned edge portions of the member 10 the said reflector is placed in position over the rear edge portion with a projection 4 located between the side portions 20. The reflector is then turned either to the right or to the left so as to place the said projection 4 underneath the rear edge of the member 10. As the next succeeding projection 4 arrives in opposed relation to the space between the side portions 20 it is permitted to drop down into a plane underneath that of the inwardly turned rear edge portion of the member 10 and may be carried underneath the said edge portion, and likewise with the third and any other projections 4 which may be present. The projections 4 having been located or placed between the opposite inwardly turned edge portions of the member 10 the reflector then may be adjusted to the position desired, as for example, that in which it is shown in Fig. 1 of the drawings.

A fastening bolt 28 for fastening the reflector upon its support extends through the elongated opening 27 in the projecting portion 22. The rear end portion of said bolt is screw threaded and extends through an elongated opening or slot 28' in a supporting bar 29. A nut 30 engages the screw threaded rear end portion of the said bolt for fastening the said projection 22 and the bar 29 together and at the same time fastening and holding the number plate 31 in position, the latter being provided with an opening as shown through which the said bolt 28 extends. In the construction as illustrated the shoulder 23 contacts with the adjoining edge of the plate 31. It of course will be understood that the shoulder 23 may be caused to contact with the edge of the bar 29. In either event the reflector will be supported and retained in predetermined relation to the plate 31 and the bar 29 or either of them. As shown in Fig. 4, the plate 31 is fixed against movement relative to the bar 29 in a well known manner.

In the construction as shown the reflector is supported and held in vertical position but it may occupy any other position which the conditions which may be met with in practice or use may require.

In Figs. 5 and 6 of the drawings we have shown a modified construction embodying our invention wherein the reflector 1' is provided with a flange 35 the diameter of which is substantially equal to the diameter between the inner rear edges 36 of the holding member 10' by which the reflector 1', the transparent plate 5' and the annular washer 6' are held in assembled relation. The reflector is protected by a sheet metal inclosure or casing 37 one end of which is closed by a bottom 38 and the opposite open end of which is provided with a laterally and outwardly extending flange 39 of substantially the same diameter as that of the flange of the reflector 1'. The flange 39 is seated against the rear side of the reflector 1' and is engaged by a split ring 15' which in turn engages a circular seat 40 which is semi-circular in cross section and which is located upon the inner side of the plate 10' in adjoining relation to the rear edge thereof. The means indicated as a whole at 41 for supporting the device illustrated in Figs. 5 and 6 is attached by means of rivets 42 to the bottom 38 of the protecting casing or closure 37 but may be secured by other means to the said bottom, or it may be secured to some other part of the said casing by known means which may be found to be suitable and practical. The supporting means 41 comprises a bar the lower end portion 43 of which is displaced with respect to the upper portion thereof so as to provide a shoulder 44. The lower end portion 43 is flat, as shown, and is provided with an elongated slot 45 which extends lengthwise thereof. In fastening the means 41 upon the bar 29', which supports the number plate 31', the portion 43 thereof is inserted between the bar 29' and the said plate 31', after which a binding or fastening bolt 46 is inserted through openings 47 and 48 in the bar 29' and plate 31' respectively, and also through the elongated opening 45, after which the nut is tightened so as to clamp the three parts together as is indicated in Fig. 5 of the drawings. The shoulder 44 is seated against the adjoining edge of the plate 31' and operates to prevent tilting or displacement of the supporting means 41 and the lamp or other device carried thereby with respect to the said plate 31'.

Although the supporting means is illustrated as embodied in a reflector structure it will be understood that the principle thereof is adapted for application to lamps or other devices which it is desired to fasten to other supports, such for example as those illustrated in the drawings.

Although as indicated devices embodying our invention may be employed for supporting objects other than reflectors or lamps yet such devices are particularly well adapted and are useful for the purpose of supporting reflectors as indicated in the drawings.

It is very desirable that the means for supporting reflectors of the character illustrated or lamps upon an automobile be of such character that it may be readily adapted for application to means or elements already present and forming a part of the automobile or other vehicular structure.

Having thus described our invention what we claim and desire to secure by Letters Patent is:

1. Supporting means of the character described, comprising a member adapted for attachment to a reflector, lamp or the like, said member having a main body portion and a portion in displaced relation thereto to provide a shoulder intermediate the said two portions, the said displaced portion having an opening therethrough through which fastening means is adapted to be inserted, and means in engagement with said shoulder to hold said member against turning.

2. A reflector, lamp or the like, comprising a reflector having a transparent sheet overlying the front thereof, an annular holding plate member for holding the said reflector and transparent plate in assembled relation, the said annular plate member having a projection extending laterally therefrom, said projection having an outer end part which is in displaced relation to the other part thereof, the connection between the two parts constituting a shoulder for engaging a member to hold said annular member against turning, the said outer end part having an opening extending therethrough.

3. In combination, a member for holding the elements of a reflector structure in assembled relation to each other, said member having a projection extending outwardly from an edge thereof, the portion of said projection in adjoining relation to said member being located in one plane and the outer end portion thereof being located in another plane and having an opening extending therethrough, the connection between the said two portions constituting a shoulder, a stationary bar, a plate adapted to be supported upon said bar, said plate and bar having openings extending therethrough, and the outer end portion of said projection being located between the said plate and bar with the opening therein in alinement with the openings in the said plate and bar, and means extending through said openings for securing the bar, plate and projection together.

4. In combination, a reflector device adapted for use upon an automobile, said device comprising a hollow reflector having an open front end and an annular member having connection with the front open end of said reflector, said annular member having a projection extending laterally from one edge thereof, said projection terminating in an outer end portion which is laterally displaced with respect to a portion thereof in adjoining relation to the said member, a connection between said portions constituting a shoulder, the said outer end portion having an opening therethrough, a bar provided upon the said automobile, a number plate supported upon said bar, said bar and number plate having openings extending therethrough and the said outer end portion of said projection being located between the said bar and plate with the said shoulder in contact with an edge of one of them, and means extending through the openings in the bar, plate and projection for fastening the same together.

5. A device of the character described, comprising a hollow reflector having an open front end, a plate overlying said open end, an annular member extending around the front edge of the said reflector and the edge of said plate, said annular member having inwardly turned front and rear edge portions, a section of the rear edge portion being bent laterally and extended to form a projection having an outer end portion which is displaced with reference to an inner portion located in adjoining relation to the said annular member, the connection between the two portions constituting a shoulder, a support for the said device, means for securing the outer end portion of said projection to said support, and means engaging said shoulder to prevent relative displacement of the said device and its support.

6. A reflector device comprising a supporting member having an annular portion with inwardly directed front and rear flanges, a reflector, a light transmitting plate, said reflector and plate individually removable from between said flanges, means removably disposed between said flanges to hold said reflector and plate in position, an extension for said supporting member in displaced relation to said annular portion to form a shoulder, structure engaging said shoulder to hold said member against rotation, and means for fastening said extension to said structure.

7. In a device of the class described, a hollow reflector provided with an outwardly turned flange on the open end thereof, a transparent cover plate for the open end of the reflector and having its edge portion supported by said flange, means for securing said reflector and cover plate in assembled relation comprising a channel-shaped member engaging about said flange and the edge of said cover plate, co-operating means on said channel-shaped member and said flange whereby said flange may be removably inserted in said channel-shaped member, removable means within said channel-shaped member and engaging with said flange to retain the reflector, cover plate and channel-shaped member in assembled relation, and a projecting portion on said channel-shaped member for attaching the device to a support.

8. In a device of the class described, a hollow reflector provided with outwardly turned projections on the open end thereof, a transparent cover plate for the open end of the reflector and having its edge portion supported by said projections, a continuous holding member engaging about said projections and the edge of said cover plate and having inwardly projecting means on its opposite edges, one of said means engaging with the edge portion of said cover plate, and removable means within said holding member and engaging with said projections and the inwardly projecting means on the opposite edge of said holding member to retain the reflector, cover plate and holding member in assembled relation.

VICTOR L. OESTNAES.
RICHARD W. LUCE.